C. D. LAWRENCE & C. E. WARD:
Adjusting Feed-Rolls for Planing-Machines.

No. 168,650.  Patented Oct. 11, 1875.

WITNESSES:

INVENTOR:
C. D. Lawrence
and
C. E. Ward

BY

ATTORNEYS.

UNITED STATES PATENT OFFICE.

CHARLES D. LAWRENCE AND CHARLES E. WARD, OF FAIRFIELD, MAINE.

IMPROVEMENT IN ADJUSTING FEED-ROLLS FOR PLANING-MACHINES.

Specification forming part of Letters Patent No. 168,650, dated October 11, 1875; application filed July 17, 1875.

*To all whom it may concern:*

Be it known that we, CHARLES D. LAWRENCE and CHAS. E. WARD, of Fairfield, in the county of Somerset and State of Maine, have invented an Improvement in Adjusting Feed-Rolls for Planing-Machines, of which the following is a specification:

The invention will first be described in connection with drawing, and then pointed out in claim.

Figure 1:
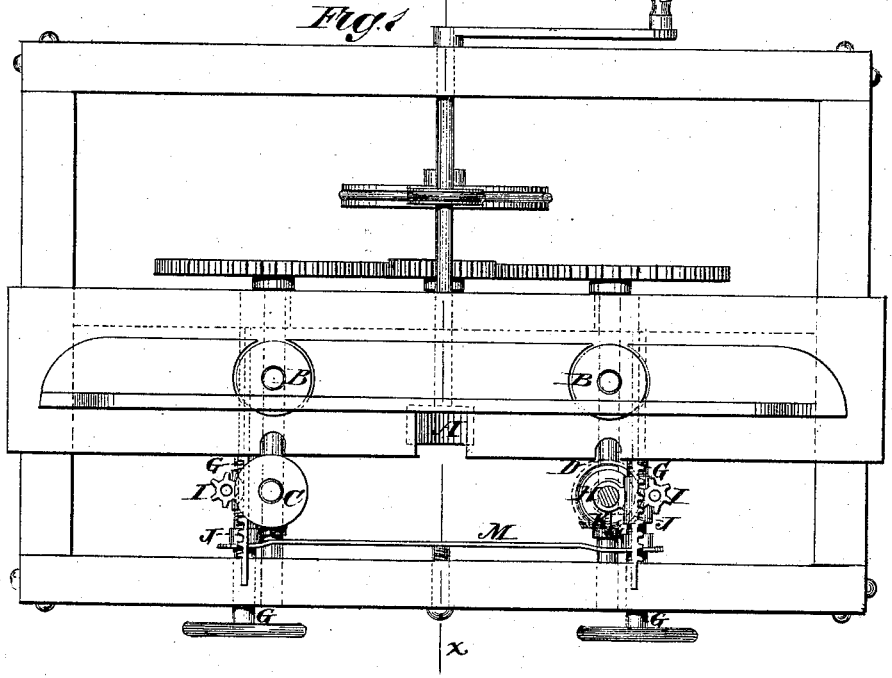
Figure 2:
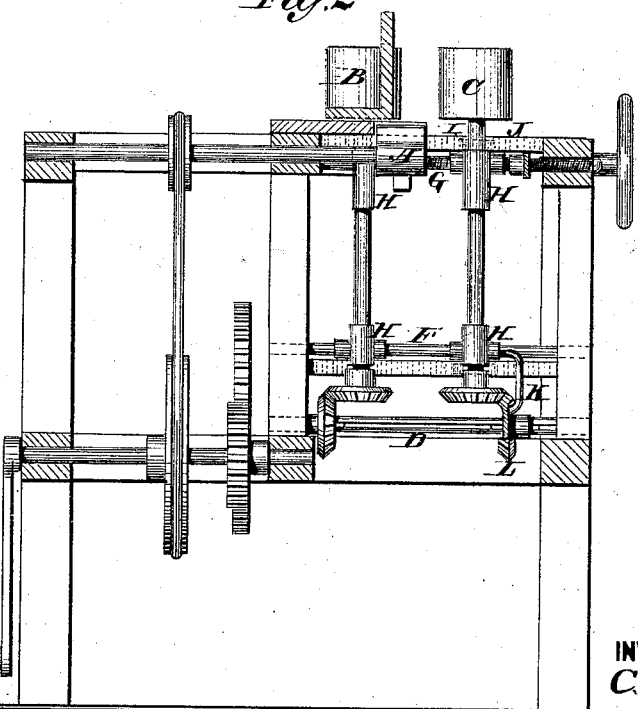

Figure 1 is a plan view of our improved planing-machine, and Fig. 2 is a transverse section, taken on the line $x\ x$.

Similar letters of reference indicate corresponding parts.

A is the rotary cutter-head; B, the feed-roll in stationary bearings; C, the movable feed-roll; and D the shaft for turning the feed-rolls. The feed-rolls are mounted on the rod F G by the bearings H, which can slide or be fixed in position as may be preferred. Those for roll C are made to slide, and they are worked by the rod G, which screws in the bearing on it; and, in order to move both upper and lower sliding bearings alike, they carry a shaft, I, with pinions gearing with the stationary racks J. K is a an arm connecting lower sliding bearing H with the sliding pinion L, which turns it to shift the pinion along with the feed-roll and keep it in gear. M is a spring, which bears the adjusting-screws toward the work to allow the feed-roll to yield to any inequalities of the stuff.

Having thus described our invention, we claim as new and desire to secure by Letters Patent—

The combination, with feed-roll shaft, rod F, screw-rod G, stationary racks J, and shaft I, having pinion at each end, of a feed screw-nut and sleeve provided with bearings for the feed-roll shaft and the shaft I, as and for the purpose specified.

CHARLES D. LAWRENCE.
    CHARLES E. WARD.

Witnesses:
  F. E. MCFADDEN,
  F. E. CLARY.